US012722663B2

(12) United States Patent
Song et al.

(10) Patent No.: US 12,722,663 B2
(45) Date of Patent: Sep. 1, 2026

(54) AUTONOMOUS VEHICLE CAPABLE OF PRECISE POSITION CORRECTION BASED ON COLLABORATIVE COGNITION AND METHOD FOR CORRECTING THE SAME

(71) Applicant: ELECTRONICS AND TELECOMMUNICATIONS RESEARCH INSTITUTE, Daejeon (KR)

(72) Inventors: You-Seung Song, Daejeon (KR); Kyoung-Wook Min, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 133 days.

(21) Appl. No.: 18/670,785

(22) Filed: May 22, 2024

(65) Prior Publication Data

US 2024/0391503 A1 Nov. 28, 2024

(30) Foreign Application Priority Data

May 23, 2023 (KR) ........................ 10-2023-0066451
May 14, 2024 (KR) ........................ 10-2024-0063072

(51) Int. Cl.
*B60W 60/00* (2020.01)
*G01S 13/931* (2020.01)
(Continued)

(52) U.S. Cl.
CPC ..... *B60W 60/00274* (2020.02); *G01S 13/931* (2013.01); *G06F 11/004* (2013.01); *H04W 4/44* (2018.02); *H04W 4/46* (2018.02)

(58) Field of Classification Search
CPC ..... B60W 60/00274; B60W 60/00276; B60W 2554/4041; B60W 2556/20;
(Continued)

(56) References Cited

U.S. PATENT DOCUMENTS

2013/0030687 A1* 1/2013 Shida .................... G01S 5/0072 701/301
2015/0276932 A1 10/2015 Lee et al.
(Continued)

FOREIGN PATENT DOCUMENTS

KR 10-2015-0055345 A 5/2015
KR 10-2017-0065895 A 6/2017
(Continued)

OTHER PUBLICATIONS

Jaehwan Jang, et al., "Preceding Vehicle Detection and Tracking with Motion Estimation by Radar-vision Sensor Fusion", Journal of the Institute of Electronics Engineers of Korea vol. 49, No. 12, Dec. 2012.

*Primary Examiner* — Jelani A Smith
*Assistant Examiner* — Alyssa Rorie
(74) *Attorney, Agent, or Firm* — LRK PATENT LAW FIRM

(57) ABSTRACT

A precise position correction method based on collaborative cognition in an autonomous vehicle includes: estimating object information on a road within a detection range on an autonomous vehicle; receiving a shared message from at least one of a first vehicle (another connected vehicle (CV) or automated vehicle (CAV)) and a road infrastructure device for V2X communication on the road, receiving the message including driving status information of the other CV when the first vehicle is the other CV, and receiving the driving status information of the other CAV and the message about a second vehicle, in which the V2X communication is not possible, recognized by the other CAV; calculating an
(Continued)

estimated error by comparing the estimated object information with the message; and setting a radius based on the first vehicle corresponding to an estimated error application radius in consideration of a distance between the autonomous vehicle and the first vehicle.

10 Claims, 12 Drawing Sheets

(51) Int. Cl.
*G06F 11/00* (2006.01)
*H04W 4/44* (2018.01)
*H04W 4/46* (2018.01)

(58) Field of Classification Search
CPC ........... B60W 2556/50; B60W 2556/65; G01S 13/931; G01S 7/003; G01S 7/4004; G01S 15/931; G01S 17/931; G01S 2013/9316; G06F 11/004; G06F 11/0739; G06F 11/0793; H04W 4/44; H04W 4/46
See application file for complete search history.

(56) References Cited

U.S. PATENT DOCUMENTS

2017/0276780 A1* 9/2017 Takehara ................ G01S 7/411
2018/0151071 A1* 5/2018 Park ........................ G01S 19/40
2019/0339082 A1* 11/2019 Doig .................. G01C 21/3848
2020/0204969 A1* 6/2020 Full ......................... H04W 4/38
2020/0234574 A1* 7/2020 Park ........................ G01S 19/07
2020/0369275 A1* 11/2020 Sugiyama ............. G01S 5/0072
2023/0008482 A1 1/2023 Yang
2023/0059897 A1* 2/2023 Miucic .................... H04W 4/44
2023/0239438 A1* 7/2023 Kim ....................... G06V 10/44
701/300

FOREIGN PATENT DOCUMENTS

KR 10-2020-0071498 A 6/2020
KR 10-2021-0007715 A 1/2021
KR 10-2021-0021204 A 2/2021
KR 10-2303716 B1 9/2021

* cited by examiner

FIG. 3

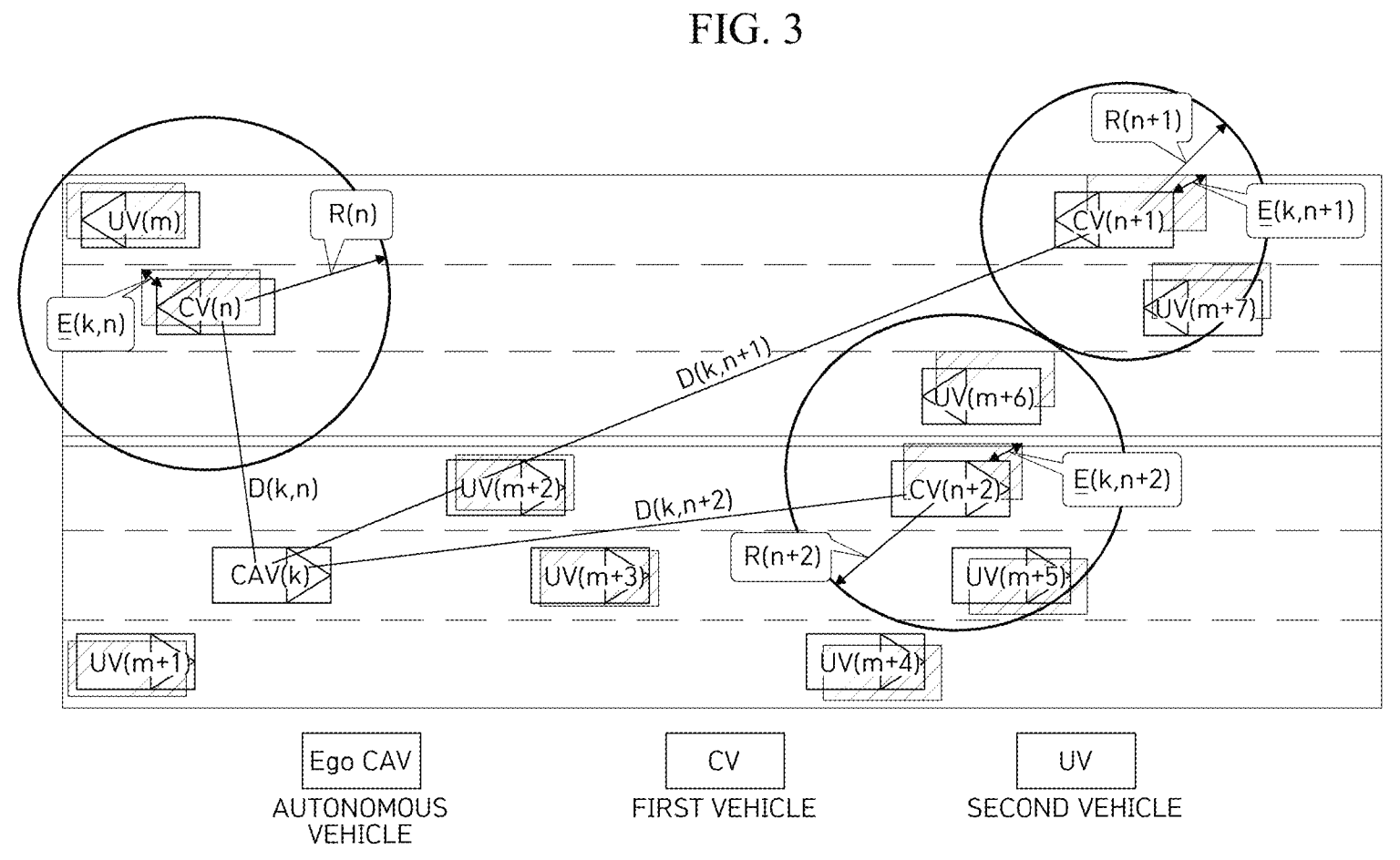

R(n+1)
E(k,n+1)
CV(n+1)
UV(m+7)
E(k,n+2)
UV(m+6)
CV(n+2)
UV(m+5)
UV(m+4)
R(n+2)
D(k,n+1)
D(k,n+2)
UV(m+3)
UV(m+2)
R(n)
D(k,n)
CAV(k)
CV(n)
UV(m)
E(k,n)
UV(m+1)
UV
SECOND VEHICLE
CV
FIRST VEHICLE
Ego CAV
AUTONOMOUS VEHICLE

AUTONOMOUS VEHICLE CAPABLE OF PRECISE POSITION CORRECTION BASED ON COLLABORATIVE COGNITION AND METHOD FOR CORRECTING THE SAME

This application claims priority to and the benefit of Korean Patent Application Nos. 10-2023-0066451, May 23, 2023, and 10-2024-0063072, May 14, 2024, the disclosure of which is incorporated herein by reference in its entirety.

BACKGROUND

1. Technical Field

The present invention relates to autonomous vehicle capable of precise position correction based on collaborative cognition and a method for correcting the same.

2. Description of Related Art

In recent years, autonomous vehicle technology has been developed innovatively. With the advancement of sensor technology and artificial intelligence algorithms, autonomous vehicles are now able to detect and analyze their surrounding environments in real time and drive on their own to some extent. This technology is gradually advancing. In other words, the autonomous vehicles may be driven safely without driver intervention by detecting and analyzing objects, lanes, traffic lights, etc., around vehicles using various sensors such as radar, lidar, and cameras. The development of these sensor sensing technologies presents the possibility of reducing traffic accidents caused by driver inattention, fatigue, and even human error.

However, despite the advancement of the autonomous vehicle technology, various difficulties still exist in autonomous driving. For example, there is a problem of differences in accuracy and performance depending on a distance between the sensor and the object. In addition, unexpected response to situations and misunderstandings that occur due to imperfections in the road environment act as one of factors limiting the reliability of an autonomous driving system. In particular, the problem of information reliability that occurs when sharing information with other vehicles may directly affect driving safety.

RELATED ART DOCUMENT

Patent Document

Korean Patent Laid-Open Publication No. 10-2015-0055345 (2015 May 21)

SUMMARY

The present invention provides an autonomous vehicle capable of precise position correction based on collaborative cognition capable of improving cognition performance of fixed or moving objects on a driving road of an autonomous vehicle through collaborative cognition with other vehicles or road infrastructure devices around the autonomous vehicle, and a method for correcting the same.

However, the problems to be solved by the present invention are not limited to the problems described above, and other problems may be present.

According to the present invention, a precise position correction method based on collaborative cognition in an autonomous vehicle includes: estimating object information on a road existing within a detection range through a sensor mounted on an autonomous vehicle; receiving a shared message from at least one of a first vehicle (another connected vehicle (CV) or another connected automated vehicle (CAV)) and a road infrastructure device capable of V2X communication existing on the road, receiving the shared message including driving status information of the other CV when the first vehicle is the other CV, and receiving the driving status information of the other CAV and the shared message about a second vehicle (the second vehicle is a vehicle in which the V2X communication is not possible) recognized by the other CAV; calculating an estimated error by comparing the estimated object information with the shared message; and setting a radius (when the first vehicle is another CV, it means a reference radius, and when the first vehicle is another CAV, it means a recognition radius) based on the first vehicle corresponding to an estimated error application radius in consideration of a distance between the autonomous vehicle and the first vehicle.

The estimating of all the object information on the road existing within the detection range through a sensor mounted on the autonomous vehicle may include estimating classification information, positional information, and cognitive accuracy for distinguishing the first vehicle and the second vehicle as the object information.

The calculating of the estimated error by comparing of the estimated object information with the shared message may include calculating the estimated error through a difference between positional information included in the estimated object information of the first vehicle and the received positional information of the first vehicle.

The method may further include correcting the object information based on the estimated error, in which the correcting of the object information based on the estimated error may include, when the first vehicle is the other CV, correcting the estimated position of the second vehicle positioned within a set radius (reference radius) by reflecting the estimated error according to the setting of the radius (reference radius) based on the first vehicle based on distance information between the autonomous vehicle and the first vehicle, cognitive accuracy for the first vehicle, and the estimated error, and updating the cognitive accuracy included in the object information to the cognitive accuracy corresponding to the corrected estimated position. In this case, the correcting of the object information based on the estimated error may include correcting estimated positions of surrounding objects (vehicles recognized by the autonomous vehicle and for which V2X communication is not possible) positioned outside the reference radius in consideration of the estimated error and updating the cognitive accuracy.

The method may further include correcting the object information based on the estimated error, in which the correcting of the object information based on the estimated error may include, when the first vehicle is the other CAV, correcting the position of the second vehicle estimated by the autonomous vehicle using the position of the second vehicle transmitted by the other CAV and updating the cognitive accuracy.

The method may further include correcting the object information based on the estimated error, in which the correcting of the object information based on the estimated error may include, when the first vehicle is both the other CV and another CAV, correcting the position of the second vehicle that exists in an overlapping area of the reference radius of the other CV and the recognition radius of another CV, correcting the position of the second vehicle through an interpolation method using both the estimated error calculated using the information received from the other CV and the information recognized by the other CAV, and updating the cognitive accuracy.

The method may further include correcting the object information based on the estimated error, in which the correcting of the object information based on the estimated error may include, when the shared message is received from the first vehicle that is the other CV and the road infrastructure device, correcting the position of the second vehicle positioned within the reference radius of the first vehicle using both the estimated error related to the first vehicle calculated by the autonomous vehicle and the estimated error related to the first vehicle calculated by the road infrastructure device.

The method may further include correcting the object information based on the estimated error, in which the correcting of the object information based on the estimated error may include, when the shared message is received from the first vehicle, which are both the other CV and another CAV, and the road infrastructure device, calculating the finally estimated error related to the other CV by jointly calculating the estimated error related to the other CV calculated by the other CAV, the estimated error related to the other CV calculated by the road infrastructure device, and the estimated error related to the other CV calculated by the autonomous vehicle, deriving the reference radius of the other CV, and correcting the position of the second object within the reference radius.

According to another embodiment of the present invention, an autonomous vehicle capable of precise position correction based on collaborative cognition includes: a sensor module composed of a predetermined sensor for detecting an object; a communication module receiving a shared message from at least one of a first vehicle (another connected vehicle (CV) or another connected automated vehicle (CAV)) and a road infrastructure device capable of V2X communication existing on the road, receiving the shared message including driving status information of the other CV when the first vehicle is the other CV, and receiving the driving status information of the other CAV and the shared message about a second vehicle (the second vehicle is a vehicle in which the V2X communication is not possible) recognized by the other CAV; a memory storing a program for estimating and correcting object information based on the shared message and sensing data of the sensor module; and a processor executing a program stored in the memory to estimate object information from the sensing data, calculating an estimated error by comparing the estimated object information and the shared message, and setting a radius (when the first vehicle is another CV, it means the reference radius, and when the first vehicle is another CAV, it means a recognition radius) based on the first vehicle corresponding to an estimated error application radius.

A computer program according to another aspect of the present invention for solving the above problems executes the precise position correction method based on collaborative cognition and is stored in a computer-readable recording medium.

Other specific details of the invention are included in the detailed description and drawings.

BRIEF DESCRIPTION OF DRAWINGS

FIG. 3 is a diagram illustrating an example of the first scenario in a driving road environment in an embodiment of the present invention.

FIG. 7 is a diagram illustrating an example of the second scenario in a driving road environment according to an embodiment of the present invention.

FIG. 11 is a diagram illustrating an example of the fourth to sixth scenarios in a driving road environment according to an embodiment of the present invention.

DESCRIPTION OF EXAMPLE EMBODIMENTS

Figure 1:
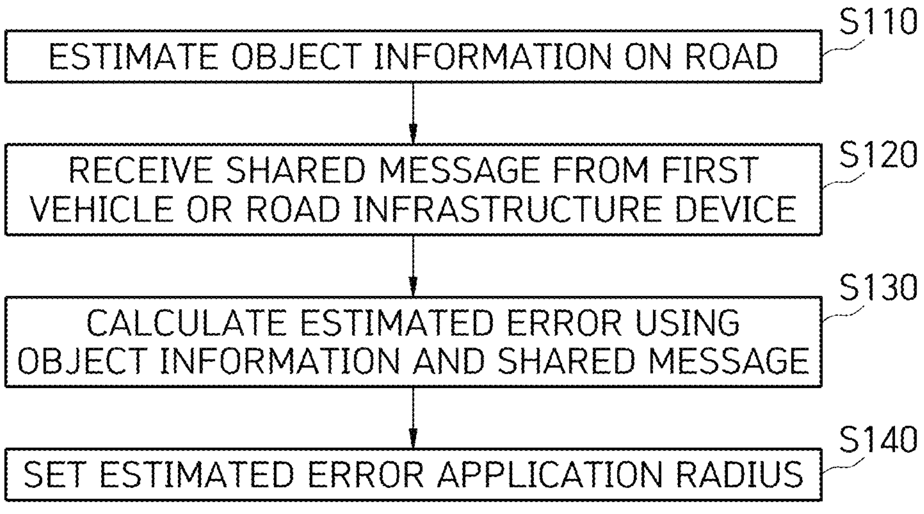
FIG. 1 is a flowchart of a precise position correction method according to an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprises" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component in the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Hereinafter, the background of the present invention will be described in detail to aid the understanding of those skilled in the art.

An autonomous vehicle may be largely divided into an upper controller and a lower controller. The upper controller manages the overall functions of the autonomous driving system and sets a destination and route of a vehicle. In addition, the upper controller analyzes the driving environment, predicts the driving situation, and issues commands to the lower controller to take appropriate actions. To perform these functions, the upper controller collects driving environment information and uses artificial intelligence technology to analyze and process data. On the other hand, the lower controller controls specific operations of the vehicle. The lower controller controls driving speed, steering, acceleration and braking, etc., and operates according to commands from the upper controller through sensors and actuators. To perform these functions, the lower controller collects sensor data and generates control signals to move the vehicle. Therefore, the upper controller and lower controller play complementary roles in the autonomous driving system, which enables safe and efficient driving of the vehicle.

For normal driving of such an autonomous driving system, accurate recognition of road objects should be preceded by correct subsequent judgment. In the autonomous driving system, sensors such as lidar, cameras, radar, and ultrasonic waves are used to recognize road objects, and GPS is used to determine your position and synchronize time. Specifically, to recognize objects on the road, LiDAR sensors scan the surrounding environment using a laser and extract distance, position, and shape information based on the scan results. The camera captures images and recognizes objects using computer vision technology. Through this, traffic lights, lanes, signs, etc., may be recognized. The radar sensor scans the surrounding environment using electromagnetic waves and extract distance, position, and speed information based on the scan results. The ultrasonic sensors scan the surrounding environment using ultrasonic waves and extract distance information based on the scan results. In this way, sensor technology for object recognition on the road is mainly used to measure the distance from surrounding objects to prevent collisions with objects or to support parking of autonomous vehicles.

The distance-dependent cognitive accuracy of the autonomous driving system may vary depending on various sensors and recognition algorithms. In general, when the recognition distance of the sensor is long, the cognitive accuracy may decrease, and the closer the recognition distance, the higher the cognitive accuracy is. In general, the accuracy of these sensors by distance may be divided into the following performance levels.

TABLE 1

| Division | Lidar | Camera | Radar | Ultrasonic Wave |
|---|---|---|---|---|
| Measuring tool | Laser, Light | Image | Electromagnetic wave | Sound wave |
| Performance (upper) distance | 0~30 m | 0~10 m | 0~50 m | 0~2 m |
| Performance (middle) distance | 30~100 m | 10~30 m | 50~150 m | 2~4 m |
| Performance (lower) distance | 100 m or more | 30 m or more | 150 m or more | 4 m or more |
| Causes of performance deterioration depending on distance | Decrease in point cloud information | Decrease in image resolution | Decrease in intensity of reflected wave in signal | Decrease in intensity of reflected wave in sound wave |

In this case, as described above, sensors used in autonomous driving systems primarily suffer from the problem of deterioration in object recognition (identification) and position estimation performance as the distance from the object to be recognized increases. In addition, in the case of services that share perceived information therearound, in the case of sharing cognitive information with low reliability using a communication device for a vehicle, secondary problems may arise for other vehicles. The cognitive accuracy for objects and environment decreases, which serves as the biggest problem in making correct judgments and decisions related to driving strategy.

In order to solve this problem, the autonomous vehicle capable of precise position correction based on collaborative cognition and method for correcting the same according to an embodiment of the present invention is to improve cognition performance of fixed or moving objects on a driving road of an autonomous vehicle through collaborative cognition with other vehicles or road infrastructure devices around the autonomous vehicle.

Hereinafter, the precise position correction method based on collaborative cognition (hereinafter referred to as the precise position correction method) in an autonomous vehicle according to an embodiment of the present invention will be described in detail with reference to FIGS. 1 to 11.

FIG. 1 is a flowchart of a precise position correction method according to an embodiment of the present invention.

A precise position correction method according to the present invention includes estimating object information on a road existing within a detection range through a sensor mounted on an autonomous vehicle (S110); receiving a shared message from at least one of a first vehicle (another connected vehicle (CV) or another connected automated vehicle (CAV)) and a road infrastructure device capable of V2X communication existing on the road, receiving the shared message including driving status information of the other CV when the first vehicle is the other CV, and receiving the driving status information of the other CAV and the shared message about a second vehicle (the second vehicle is a vehicle in which the V2X communication is not possible) recognized by the other CAV (S120); calculating an estimated error by comparing the estimated object information with the shared message (S130); and setting a radius (when the first vehicle is another CV, it means a reference radius, and when the first vehicle is another CAV, it means a recognition radius) based on the first vehicle corresponding to an estimated error application radius in consideration of a distance between the autonomous vehicle and the first vehicle (S140).

In the present invention, the classifications of vehicles positioned on the driving road are largely divided into three categories. First, the autonomous vehicle is a connected automated vehicle (CAV) capable of recognizing surrounding objects through the V2X communication and various sensors. In this case, in the description of the present invention, in distinction from the autonomous vehicle, the autonomous vehicle, not an own vehicle, is referred to as another autonomous vehicle (another CAV). The second vehicle is an unequipped vehicle (UV), which is a general vehicle incapable of the V2X communication. In addition to vehicles, the road infrastructure device in the description of the present invention is an intelligent road side unit (IRSU) installed on a roadside, and may be equipped with various sensors and communication devices to recognize driving road objects, understand the flow of vehicles, and transmit and receive various safety messages to and from vehicles.

In an embodiment of the present invention, the precise position correction method correction method according to the scenario shown in Table 2 may be provided depending on the classification of vehicles and the presence or absence of road infrastructure devices.

TABLE 2

| Scenario | CAV | CV | UV | IRSU |
|---|---|---|---|---|
| 1 | ○(One) | ○ | ○ | X |
| 2 | ○(Multiple) | ○ | ○ | X |
| 3 | ○(One) | ○ | ○ | ○(One) |
| 4 | ○(Multiple) | ○ | ○ | ○(One) |
| 5 | ○(One) | ○ | ○ | ○(Multiple) |
| 6 | ○(Multiple) | ○ | ○ | ○(Multiple) |

Hereinafter, the precise position correction method according to an embodiment of the present invention will be described in more detail for each scenario.

Figure 2:
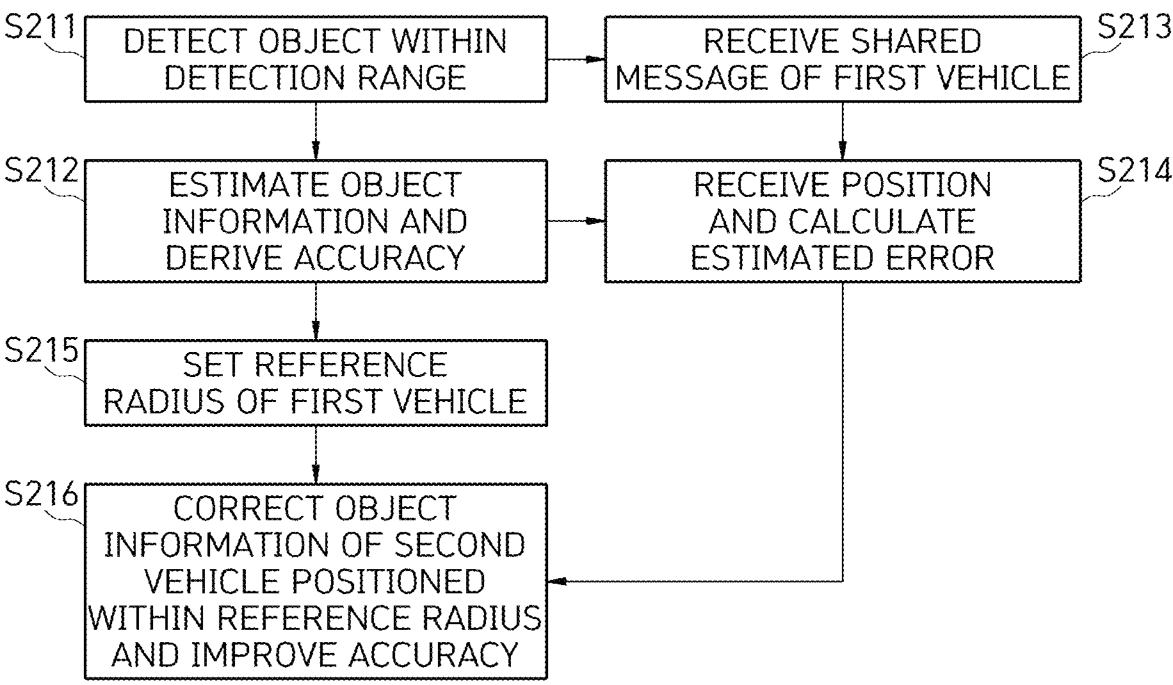
FIG. 2 is a flowchart of a precise position correction method according to a first scenario in an embodiment of the present invention.

FIG. 2 is a flowchart of a precise position correction method according to a first scenario in an embodiment of the present invention. FIG. 3 is a diagram illustrating an example of the first scenario in a driving road environment in an embodiment of the present invention.

In one embodiment, the first scenario is the situation where there are one autonomous vehicle (CAV) and a plurality of first vehicles (CV) and second vehicles (UV), and represents a method for improving positional information of a vehicle detected through a sensor in the environment where an autonomous vehicle has a plurality of first and second vehicles.

In this case, in FIG. 3, the object information on the driving road detected through the sensor of the autonomous vehicle is represented by a separate hatched box. The autonomous vehicle estimates classification tasks for all objects within the sensor detection range, the corresponding object positions, etc., and recognition errors occur complexly depending on a distance between objects, a detection area of the object, and a degree of occlusion.

In the present invention, the following notation is used for convenience of explanation of each scenario.

| | |
|---|---|
| CAV(k): | k-th autonomous vehicle(CAV) |
| CV(n): | n-th first vehicle (CV) |
| UV(m): | m-th second vehicle (UV) |
| IRSU(i): | i-th road infrastructure device (IRSU) |
| E(k, n): | Recognition error of n-th vehicle detected by CAV(k) vehicle |
| C(k, n): | Cognitive accuracy of n-th vehicle detected by CAV(k) vehicle |
| D(k, n): | Distance between CAV(k) vehicle and n-th vehicle |
| R(n): | Radius based on n-th vehicle |

Referring to FIGS. 2 and 3, first, the object information on the road existing within the detection range is estimated through the sensors mounted on the autonomous vehicle (S211 and S212). In this case, the object information estimated by the autonomous vehicle may include the classification information that distinguish the first vehicle and the second vehicle, the positional information, and the cognitive accuracy.

The autonomous vehicle CAV(k) may estimate the classification, the position, the speed, the direction, etc., of all moving objects CV and UV within the detection range using the mounted sensors. In this case, the estimated positions of each vehicle detected by the CAV(k) may be defined as p(k, n)=[x(k, n), y(k, n), z(k, n)]. Here, k and n refer to the autonomous vehicle CAV and the index of the detected vehicle, respectively. In addition, the autonomous vehicle may obtain the cognitive accuracy C(k, n) for each detected vehicle as the object information based on the detection area, etc., of the detected vehicle.

Simultaneously with or differently from steps S311 and S312, the autonomous vehicle receives the shared message from the first vehicle (S213). When the first vehicle is the CV, the information such as the position, speed, and direction of the vehicle may be calculated in real time through GPS in the vehicle. The first vehicle periodically broadcasts to the surrounding area using the mounted vehicle communication device. The shared message is also transmitted to the autonomous vehicle CAV(k). The positional information of the first vehicle received from the first vehicle CV(n) to the autonomous vehicle CAV(k) may be defined as P(k, n)=[X(k, n), Y(k, n), Z(k, n)].

Next, the autonomous vehicle calculates the estimated error by comparing the estimated object information with the shared message received from the first vehicle (S214). In this case, the autonomous vehicle may calculate the estimated error through the difference between the positional information included in the object information estimated for the first vehicle and the positional information of the first vehicle included in the shared message received from the first vehicle. In the example of FIG. 3, the difference between the positional information p(k, n) of the first vehicle detected by the sensor of the autonomous vehicle CAV(k) and the positional information p(k, n) of the first vehicle included in the shared message received from the first vehicle CV(n) may be defined as the estimated error E(k, n)=[Ex(k, n), Ey(k, n), Ez(k, n)].

Next, the autonomous vehicle may set the reference radius of the first vehicle based on the distance information D between the autonomous vehicle and the first vehicle, the cognitive accuracy for the first vehicle, and the estimated error (S215). Here, the reference radius R is a value for selecting a target vehicle (second vehicle) on which the estimated position correction will be performed, and refers to the radius value based on the first vehicle (CV). Here, D>>R.

According to another embodiment of the present invention, the area for selecting the target vehicle (second vehicle) on which the estimated position correction will be performed may be set as an area of various shapes, rather than a circular area formed according to a certain radius. For example, it may be a peanut-shaped area formed based on the first vehicle, or may be formed to include a partial area additionally extending to the above-mentioned circular area. For example, in the situation where a predetermined reference radius is set, when there is no additional CV that recognizes a specific second vehicle on the road, some areas of the circle area according to the reference radius may be changed to be expanded outward so that the corresponding specific second vehicle is included in the position correction target area.

Next, the autonomous vehicle may correct the object information based on the calculated estimated error (S216). In this case, the distance between the autonomous vehicle and the first vehicle corresponding to the estimated error exceeds the reference radius set for the first vehicle by a predetermined ratio, and the autonomous vehicle may correct the object information of the second vehicle positioned within the reference radius.

Referring to the example of FIG. 3, the autonomous vehicle CAV(k) uses the estimated error E(k, n) to correct the estimated position Pc(k, m) of the second vehicle UV(m) within the reference radius R(n) of the first vehicle CV(n) to Pc(k, m), and the cognitive accuracy may be updated to C(k, m). In this case, the range of the reference radius R(n) may be comprehensively determined through the distance D(k, n) between the CAV(k) and the CV(n), the cognitive accuracy c(k, n), and the estimated error E(k, n). Meanwhile, in the description of the present invention, the algorithm for the method for calculating a recognition radius R(n) is not discussed.

The object information and corrected information of the objects detected by the autonomous vehicle CAV(k) described above are shown in Table 3 as follows. In this case, the information corrected through the first scenario is represented in bold and underlined.

higher than the accuracy of the positional information recognized by the autonomous vehicle CAV(k), the positional information recognized by its own sensor may be replaced with the positional information of the first vehicle included in the shared message received from the first vehicle CV.

Figure 4:
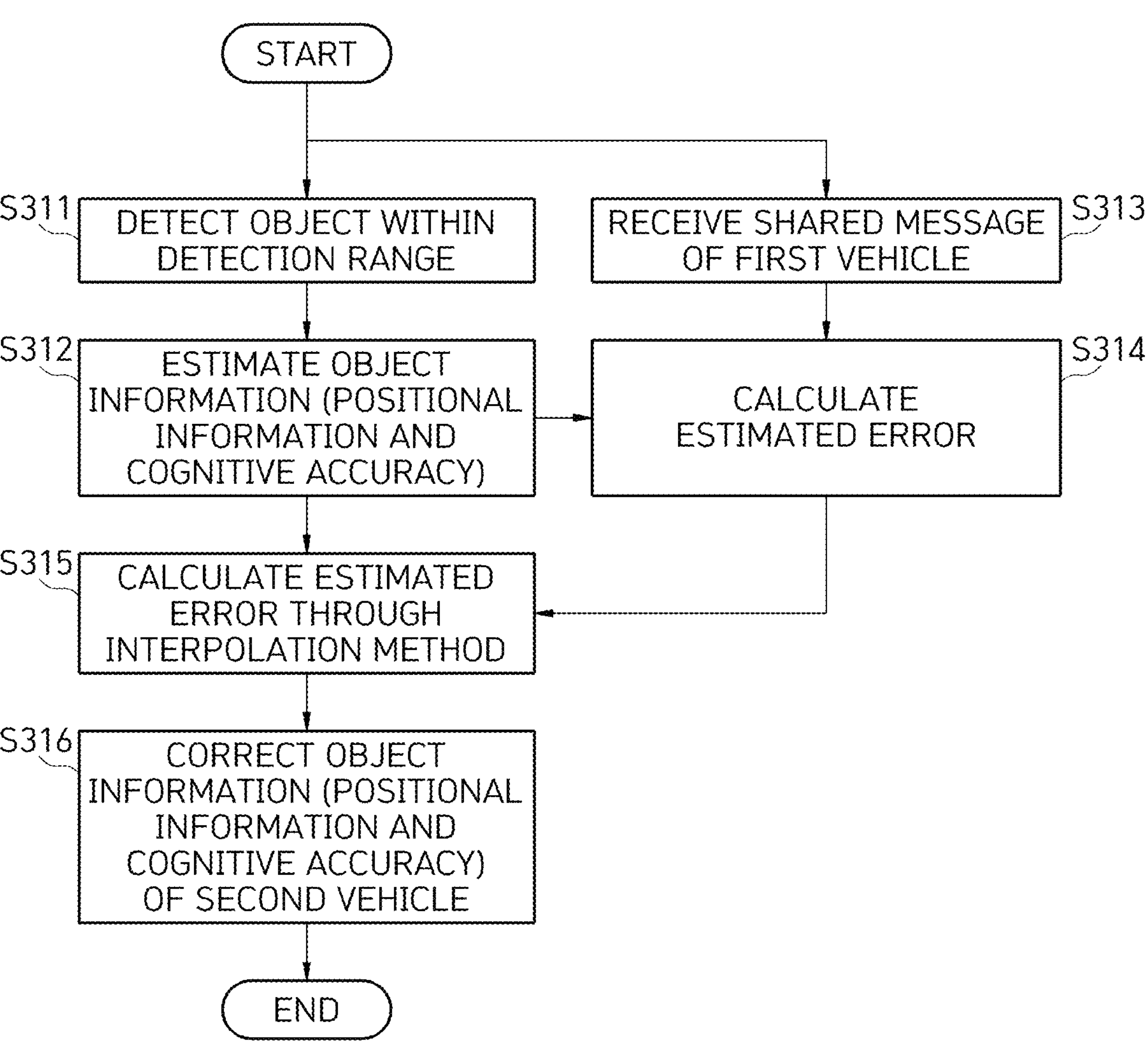
FIG. 4 is a flowchart of a precise position correction method according to a first scenario in another embodiment of the present invention.
Figure 5:
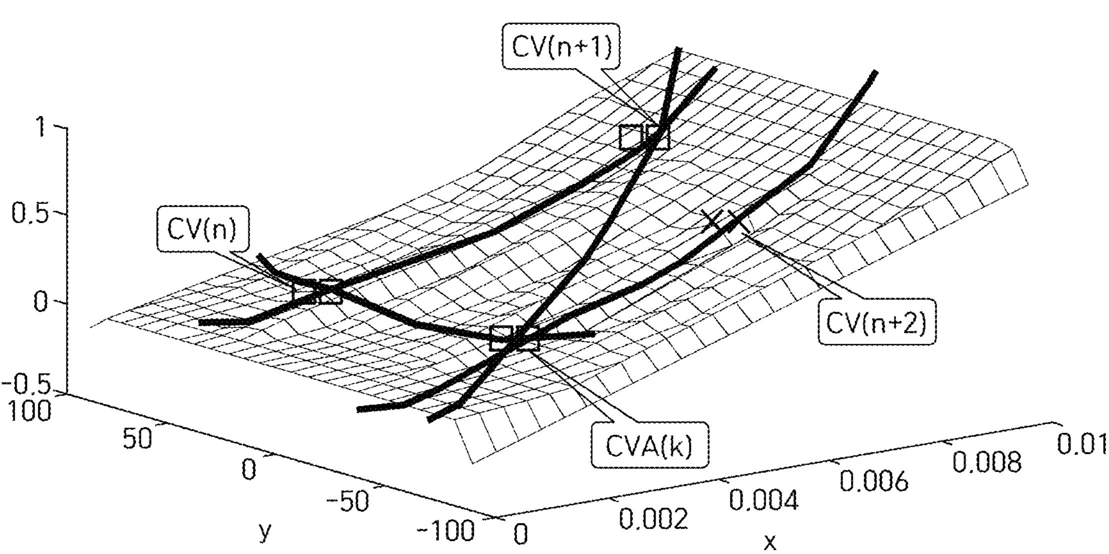
FIG. 5 is a diagram for describing correction contents of object information using interpolation information in an embodiment of the present invention.

FIG. 4 is a flowchart of a precise position correction method according to a first scenario in another embodiment of the present invention. FIG. 5 is a diagram for describing correction contents of object information using interpolation information in an embodiment of the present invention. In this case, FIGS. 4 and 5 describe a method of using interpolation information to correct errors for the second vehicle UV(m+1) to UV(m+4) in FIG. 3.

In one embodiment, the autonomous vehicle estimates the object information on the road existing within the detection range through the mounted sensor (S311 and S312). Simultaneously with or differently from steps S311 and S312, the autonomous vehicle receives the shared message from the first vehicle (S313).

Next, the autonomous vehicle calculates the estimated error as in step S214 (S314) and calculates the estimated error through the interpolation method (S315). Next, the autonomous vehicle may correct the object information based on the calculated estimated error (S316).

TABLE 3

| ID | Classification | Estimated position | Cognitive accuracy | Received position | Estimated error | Corrected position | Improved cognitive accuracy |
|---|---|---|---|---|---|---|---|
| m | UV | p(k, m) | c(k, m) | N/A | N/A | **Pc(k, m)** | **C(k, m)** |
| n | CV | p(k, n) | c(k, n) | P(k, n) | E(k, n) | P(k, n) | C(k, n) |
| m + 1 | UV | p(k, m + 1) | c(k, m + 1) | N/A | N/A | N/A | N/A |
| m + 2 | UV | p(k, m + 2) | c(k, m + 2) | N/A | N/A | N/A | N/A |
| m + 3 | UV | p(k, m + 3) | c(k, m + 3) | N/A | N/A | N/A | N/A |
| m + 4 | UV | p(k, m + 4) | c(k, m + 4) | N/A | N/A | N/A | N/A |
| m + 5 | UV | p(k, m + 5) | c(k, m + 5) | N/A | N/A | **Pc(k, m + 5)** | **C(k, m + 5)** |
| n + 2 | CV | p(k, n + 2) | c(k, n + 2) | P(k, n + 2) | E(k, n + 2) | P(k, n + 2) | C(k, n + 2) |
| m + 6 | UV | p(k, m + 6) | c(k, m + 6) | N/A | N/A | **Pc(k, m + 6)** | **C(k, m + 6)** |
| m + 7 | UV | p(k, m + 7) | c(k, m + 7) | N/A | N/A | **Pc(k, m + 7)** | **C(k, m + 7)** |
| n + 1 | CV | p(k, n + 1) | c(k, n + 1) | P(k, n + 1) | E(k, n + 1) | P(k, n + 1) | C(k, n + 1) |

Specifically, Table 3 shows an example in which the autonomous vehicle CAV(k) corrects object information of a second vehicle UV positioned within a reference radius R and improves cognitive accuracy by referring to the shared message received from the first vehicle CV. As a result, the positional information of the second vehicle UV(m), UV(m+5), UV(m+6), and UV(m+7) is corrected, and the cognitive accuracy is improved.

In addition, when the accuracy of the positional information of the first vehicle received from the first vehicle is For example, the estimated error interpolation information may be calculated and configured in a two-dimensional or three-dimensional surface form, as illustrated in FIG. 5, or may be configured in a two-dimensional linear form. By calculating the estimated error calculated through the estimated error interpolation information through the example in FIG. 5, the table profile values in Table 3 may be represented as in Table 4. In this case, the information updated by applying the estimated error interpolation information is represented in bold and underlined.

TABLE 4

| ID | Classification | Estimated position | Cognitive accuracy | Received position | Estimated error | Corrected position | Improved cognitive accuracy |
|---|---|---|---|---|---|---|---|
| m | UV | p(k, m) | c(k, m) | N/A | N/A | **Pc(k, m)** | **C(k, m)** |
| n | CV | p(k, n) | c(k, n) | P(k, n) | E(k, n) | P(k, n) | C(k, n) |
| m + 1 | UV | p(k, m + 1) | c(k, m + 1) | N/A | N/A | N/A | N/A |
| m + 2 | UV | p(k, m + 2) | c(k, m + 2) | N/A | N/A | N/A | N/A |
| m + 3 | UV | p(k, m + 3) | c(k, m + 3) | N/A | N/A | N/A | N/A |
| m + 4 | UV | p(k, m + 4) | c(k, m + 4) | N/A | N/A | N/A | N/A |
| m + 5 | UV | p(k, m + 5) | c(k, m + 5) | N/A | N/A | **Pc(k, m + 5)** | **C(k, m + 5)** |
| n + 2 | CV | p(k, n + 2) | c(k, n + 2) | P(k, n + 2) | E(k, n + 2) | P(k, n + 2) | C(k, n + 2) |
| m + 6 | UV | p(k, m + 6) | c(k, m + 6) | N/A | N/A | **Pc(k, m + 6)** | **C(k, m + 6)** |

TABLE 4-continued

| ID | Classi-fication | Estimated position | Cognitive accuracy | Received position | Estimated error | Corrected position | Improved cognitive accuracy |
|---|---|---|---|---|---|---|---|
| m + 7 | UV | p(k, m + 7) | c(k, m + 7) | N/A | N/A | **Pc(k, m + 7)** | **C(k, m + 7)** |
| n + 1 | CV | p(k, n + 1) | c(k, n + 1) | P(k, n + 1) | E(k, n + 1) | P(k, n + 1) | C(k, n + 1) |

In Table 4, it can be seen that the estimated error is calculated and applied to the second vehicle UVs that are not included in the reference radius R of the existing first vehicle CV. Accordingly, the correction position value may be calculated for second vehicles UV(m+1) to UV(m+4), and then the cognitive accuracy may also be updated.

Figure 6:
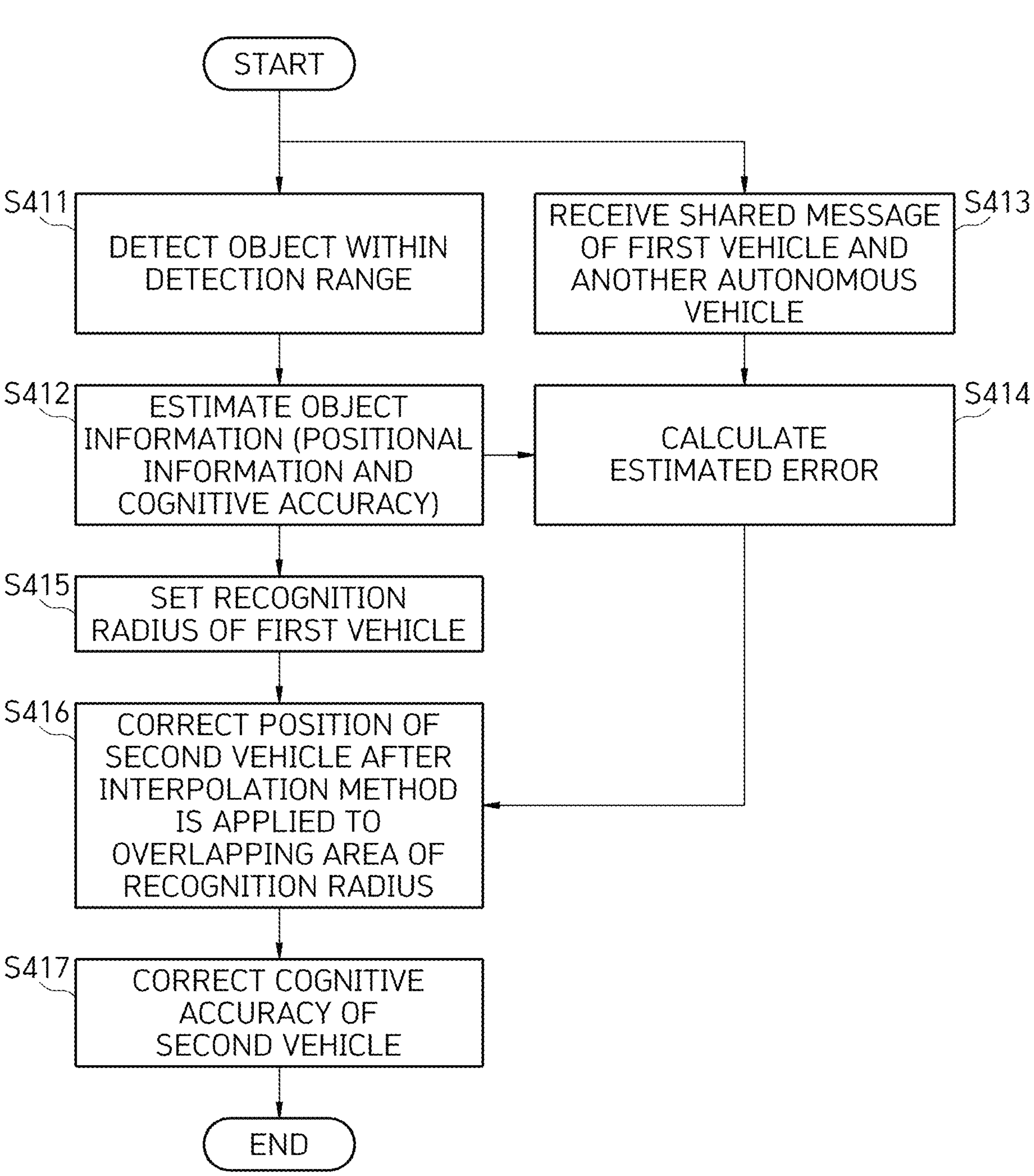
FIG. 6 is a flowchart of a precise position correction method according to a second scenario in an embodiment of the present invention.
Figure 7:
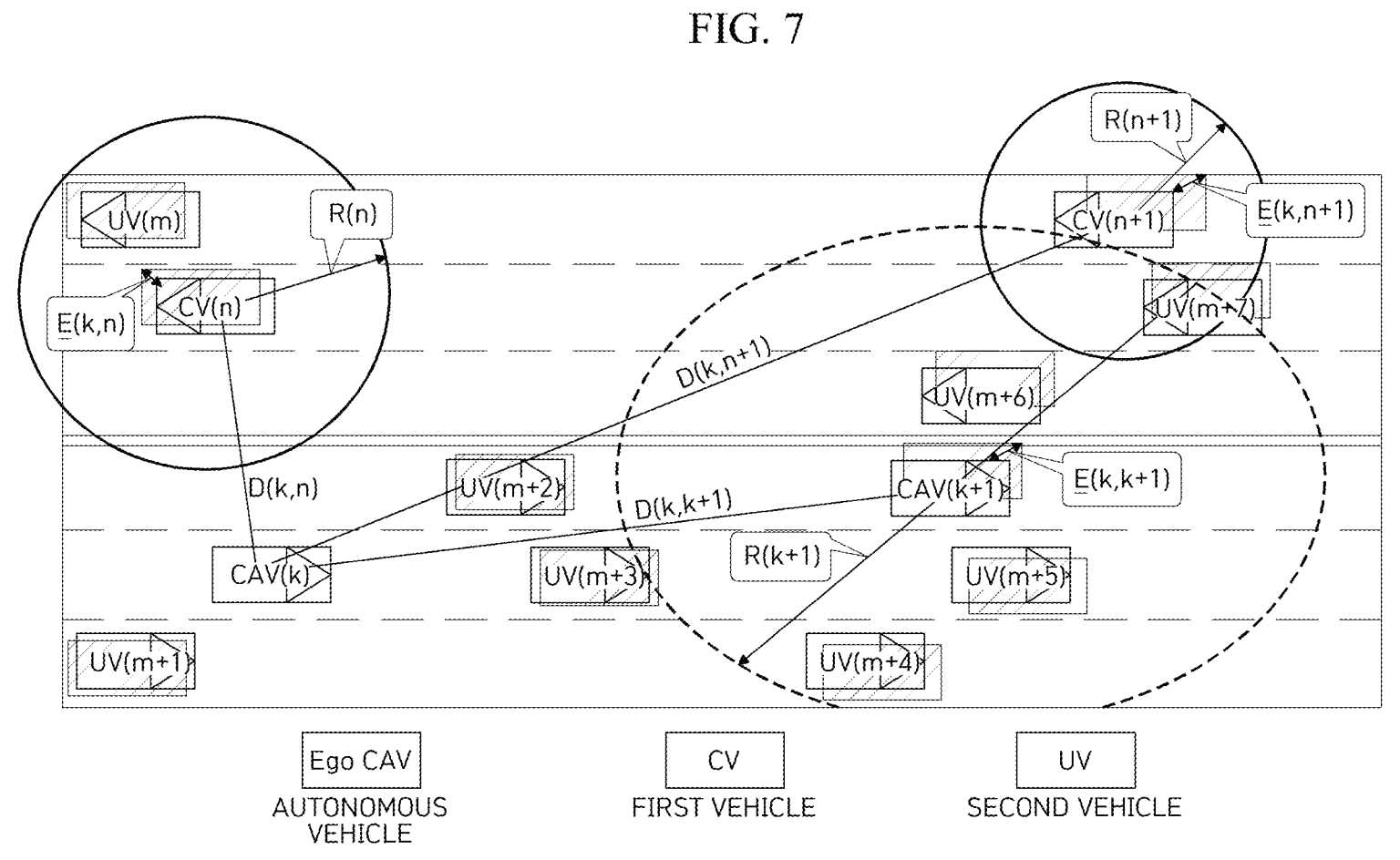

FIG. 6 is a flowchart of a precise position correction method according to a second scenario in an embodiment of the present invention. FIG. 7 is a diagram illustrating an example of the second scenario in the driving road environment according to an embodiment of the present invention. In this case, in the description of the second scenario, descriptions that overlap with the descriptions of the first scenario described above are omitted as much as possible, but are not necessarily excluded.

The second scenario is a situation where a plurality of CAVs, CVs, and UVs exist, and represents a situation where the first vehicle is another CAV and another CV.

In one embodiment, the autonomous vehicle estimates object information on the road existing within the detection range through the mounted sensor (S411 and S412). Simultaneously with or differently from steps S411 and S412, the autonomous vehicle receives a shared message including the driving status information of another CAV and the information of the second vehicle recognized by another CAV from the first vehicle, which is another CAV, and receives the shared message including driving status information of another CV from the first vehicle which is another CV (S413).

In FIG. 7, the autonomous vehicle CAV(k) represents the own vehicle, and another autonomous vehicle CAV(k+1) recognizes objects existing within the recognition radius R(k+1) through various mounted sensors, and estimates the position and generate the estimated position as the object information. Therefore, another autonomous vehicle CAV (k+1) broadcasts object information (vehicle classification information, positional information, cognitive accuracy, etc.) existing within the recognition radius R(k+1) to the surrounding area through the shared message, and the autonomous vehicle CAV(k) may receive the shared message and use the received shared message for more accurate road object recognition.

Next, the autonomous vehicle calculates the estimated error as in step S214 (S414). Then, the autonomous vehicle may set the recognition radius of the first vehicle, that is, the recognition radius for determining the position correction target, based on the distance information between the autonomous vehicle and the first vehicle, the cognitive accuracy for the first vehicle, and the estimated error (S415). In this case, the autonomous vehicle may correct the object information when the distance between the autonomous vehicle and the first vehicle corresponding to the estimated error exceeds the recognition radius set for the first vehicle by a predetermined ratio or more.

Next, the autonomous vehicle may correct the object information (positional information and cognitive accuracy) within the recognition radius of the first vehicle, which is the CAV, based on the estimated error calculated from the relationship of CV(n+1) (S416 and S417). In this case, the autonomous vehicle determines whether the second vehicle exists in the overlapping area between the recognition radius of another autonomous vehicle and the recognition radius of the first vehicle. As a result of the determination, when the second vehicle exists in the overlapping area, by applying the predetermined interpolation technique to the positional information and estimated error included in the object information of another autonomous vehicle, the estimated position of the second vehicle existing in the overlapping area may be corrected.

Another autonomous vehicle CAV(k+1) may recognize the second vehicle UV(m+4) to UV(m+6) that exists within the recognition radius R(k+1) of the other autonomous vehicle CAV(k+1), and thus use the shared information as it is. In this case, in the case of the second vehicle UV(m+7) that commonly exists within the recognition radius of another autonomous vehicle CAV(k+1) and the reference radius of the CV(n+1), by using both the object information shared by another autonomous vehicle CAV(k+1) and the estimated error calculated through the CV, the final position of the second vehicle UV(m+7) may be corrected by the interpolation method, and the cognitive accuracy may be improved.

Together with or separately from this, when the recognition range between the autonomous vehicle and another autonomous vehicle overlaps, the autonomous vehicle may determine whether the cognitive accuracy included in the object information of another autonomous vehicle for the second vehicle existing in the overlapping area has a higher accuracy than the cognitive accuracy included in the object information of the autonomous vehicle. As a result of determination, when the cognitive accuracy is high, the positional information estimated for the second vehicle may be updated to the positional information of the second vehicle included in the object information of another autonomous vehicle.

TABLE 5

| ID | Classi-fication | Estimated position | Cognitive accuracy | Received position | Estimated error | Corrected position | Improved cognitive accuracy |
|---|---|---|---|---|---|---|---|
| m | UV | p(k, m) | c(k, m) | N/A | N/A | Pc(k, m) | C(k, m) |
| n | CV | p(k, n) | c(k, n) | P(k, n) | E(k, n) | P(k, n) | C(k, n) |
| m + 1 | UV | p(k, m + 1) | c(k, m + 1) | N/A | N/A | N/A | N/A |
| m + 2 | UV | p(k, m + 2) | c(k, m + 2) | N/A | N/A | N/A | N/A |

TABLE 5-continued

| ID | Classi-fication | Estimated position | Cognitive accuracy | Received position | Estimated error | Corrected position | Improved cognitive accuracy |
|---|---|---|---|---|---|---|---|
| m + 3 | UV | p(k, m + 3) | c(k, m + 3) | N/A | N/A | N/A | N/A |
| m + 4 | UV | p(k, m + 4) | c(k, m + 4) | **P(k + 1, m + 4)** | **E(k, m + 4)** | **P(k + 1, m + 4)** | **C(k, m + 4)** |
| m + 5 | UV | p(k, m + 5) | c(k, m + 5) | **P(k + 1, m + 5)** | **E(k, m + 5)** | **P(k + 1, m + 5)** | **C(k, m + 5)** |
| k + 1 | CAV | p(k, k + 1) | c(k, k + 1) | P(k, k + 1) | **E(k, k + 1)** | P(k, k + 1) | C(k, k + 1) |
| m + 6 | UV | p(k, m + 6) | c(k, m + 6) | **P(k + 1, m + 6)** | **E(k, m + 6)** | **P(k + 1, m + 6)** | **C(k, m + 6)** |
| m + 7 | UV | p(k, m + 7) | c(k, m + 7) | **P(k + 1, m + 7)** | **E(k, m + 7)** | **Pc(k, m + 7)** | **C(k, m + 7)** |
| n + 1 | CV | p(k, n + 1) | c(k, n + 1) | P(k, n + 1) | E(k, n + 1) | P(k, n + 1) | C(k, n + 1) |

[Table 5] shows an example in which the autonomous vehicle CAV(k) corrects and manages the positional information of the CAV, CV, and UV of other surrounding vehicles in the second scenario environment. In this case, the information updated through the second scenario is displayed in bold and underlined. The method for CV(n) and second vehicle UV(m) to UV(m+3) is the same as the method described in [Table 3] in the first scenario described above. Similar to the first vehicle CV(n+1), the positional information of another autonomous vehicle CAV(k+1) is corrected by using the vehicle information acquired through the shared message as it is. In the case of the second vehicle UV(m+4) to UV(M+6), the positional information and cognitive accuracy recognized and shared by another autonomous vehicle CAV(k+1) may be used as they are. In the case of the second vehicle UV(m+7) positioned in the overlapping area, by an estimated error E(K, n+1) calculated through the relationship between positional information P(k+1, m+7) shared by another autonomous vehicle CAV (k+1) and CV(n+1), the position of the UV(m+7) vehicle may be corrected to Pc(k, m+7) and the cognitive accuracy may be updated.

Figure 8:
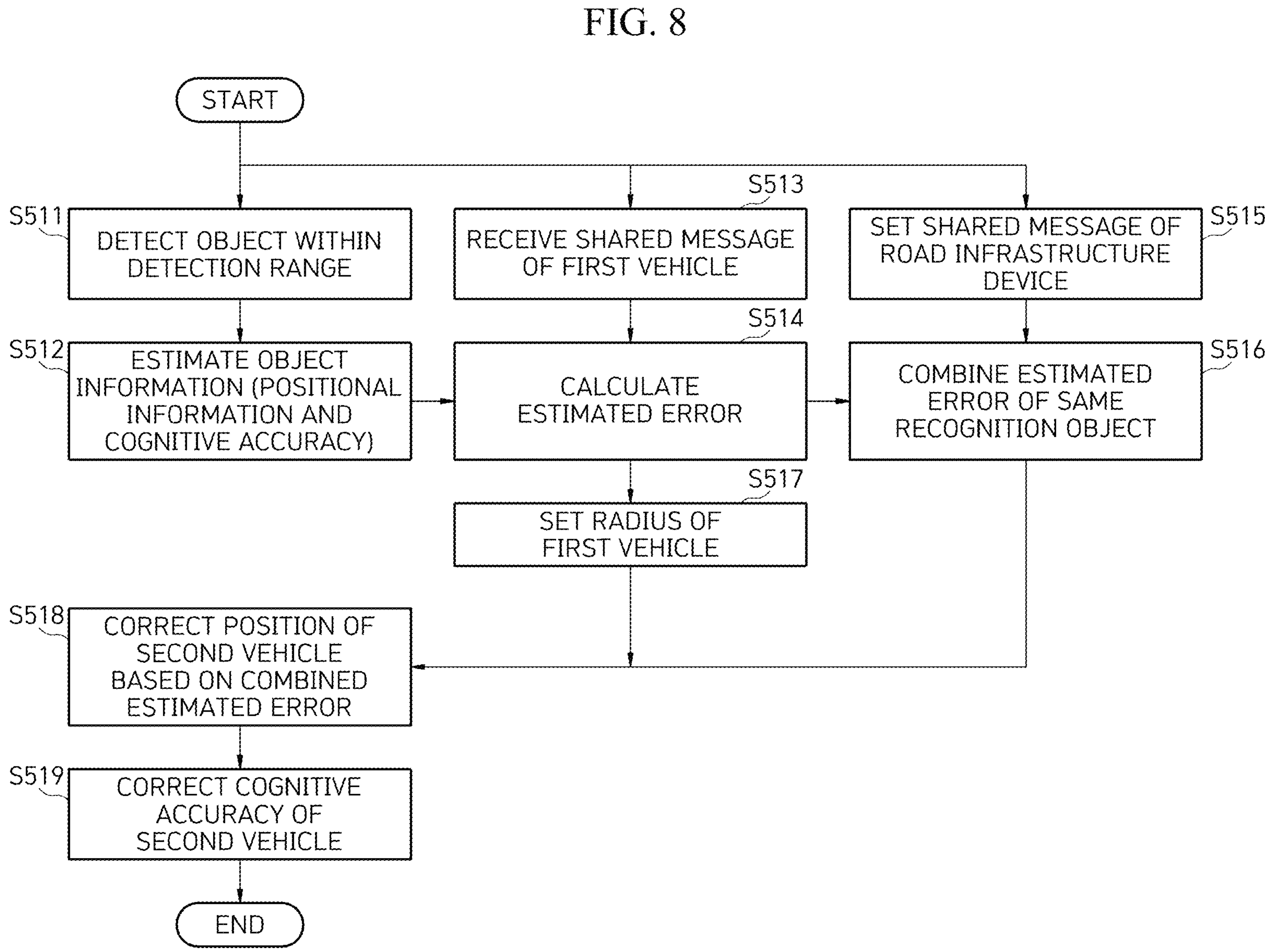
FIG. 8 is a flowchart of a precise position correction method according to a third scenario in an embodiment of the present invention.
Figure 9:
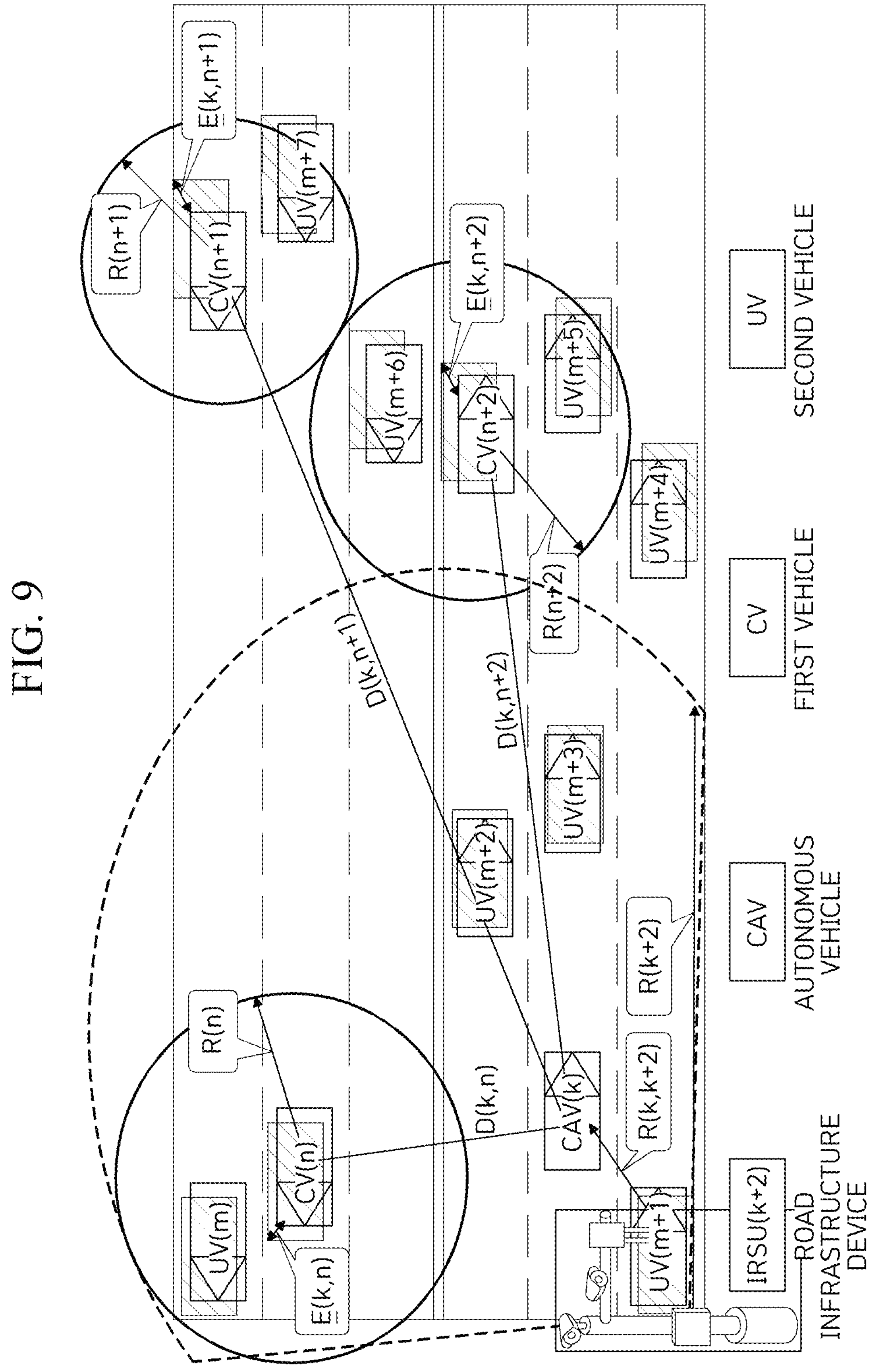
FIG. 9 is a diagram illustrating an example of the third scenario in a driving road environment according to an embodiment of the present invention.

FIG. 8 is a flowchart of a precise position correction method according to a third scenario in an embodiment of the present invention. FIG. 9 is a diagram illustrating an example of the third scenario in the driving road environment according to an embodiment of the present invention. In this case, in the description of the third scenario, descriptions that overlap with the descriptions of the first and second scenarios described above are omitted as much as possible, but are not necessarily excluded.

The third scenario represents a scenario for correcting the position of the second vehicle in a situation where one road infrastructure device and a plurality of first vehicles exist.

Sensors mounted on the road infrastructure device are mounted at relatively high positions. Therefore, since a wide range of object recognition is possible and the sensors are fixed, object recognition errors are relatively small compared to vehicles. Taking advantage of these advantages, according to an embodiment of the present invention, as illustrated in FIG. 9, in the situation where objects recognized by the autonomous vehicle CAV(k) and a road infrastructure device IRSU(k+2) overlap and the vehicle CAV(k) and the first vehicle CV(n) are included within the object recognition range of the road infrastructure device, the position estimation and correction for the second vehicle UV(m) are possible.

In one embodiment, the autonomous vehicle estimates the object information on the road existing within the detection range through the mounted sensor (S511 and S512). Simultaneously with or at steps S511 and S512, the autonomous vehicle receives the shared message from the first vehicle and the road infrastructure device (S513 and S515). In this case, the autonomous vehicle may receive the object information existing within the recognition range of the road infrastructure device through the shared message broadcast from the road infrastructure device.

Next, the autonomous vehicle calculates the estimated error as in step S214 (S514). Similarly, the road infrastructure device may also calculate the estimated error through the difference between the positional information included in the object information estimated for the first vehicle and the positional information of the first vehicle received by the road infrastructure device, so the estimated error calculated by the autonomous vehicle and the estimated error calculated by the road infrastructure device are combined (S516).

Next, the autonomous vehicle may set a reference radius of the first vehicle based on the distance information between the autonomous vehicle and the first vehicle, the cognitive accuracy for the first vehicle, and the calculated estimated error (S517). As described above, when the first vehicle is the CV, the reference radius is set. The distance between the autonomous vehicle and the first vehicle corresponding to the estimated error exceeds the reference radius set for the first vehicle by a predetermined ratio, and the autonomous vehicle may correct the positional information of the second vehicle positioned within the reference radius.

Next, the autonomous vehicle may correct the object information (cognitive accuracy) for the second vehicle UV(m) by reflecting the combined estimated error (S518 and S519).

Figure 10:
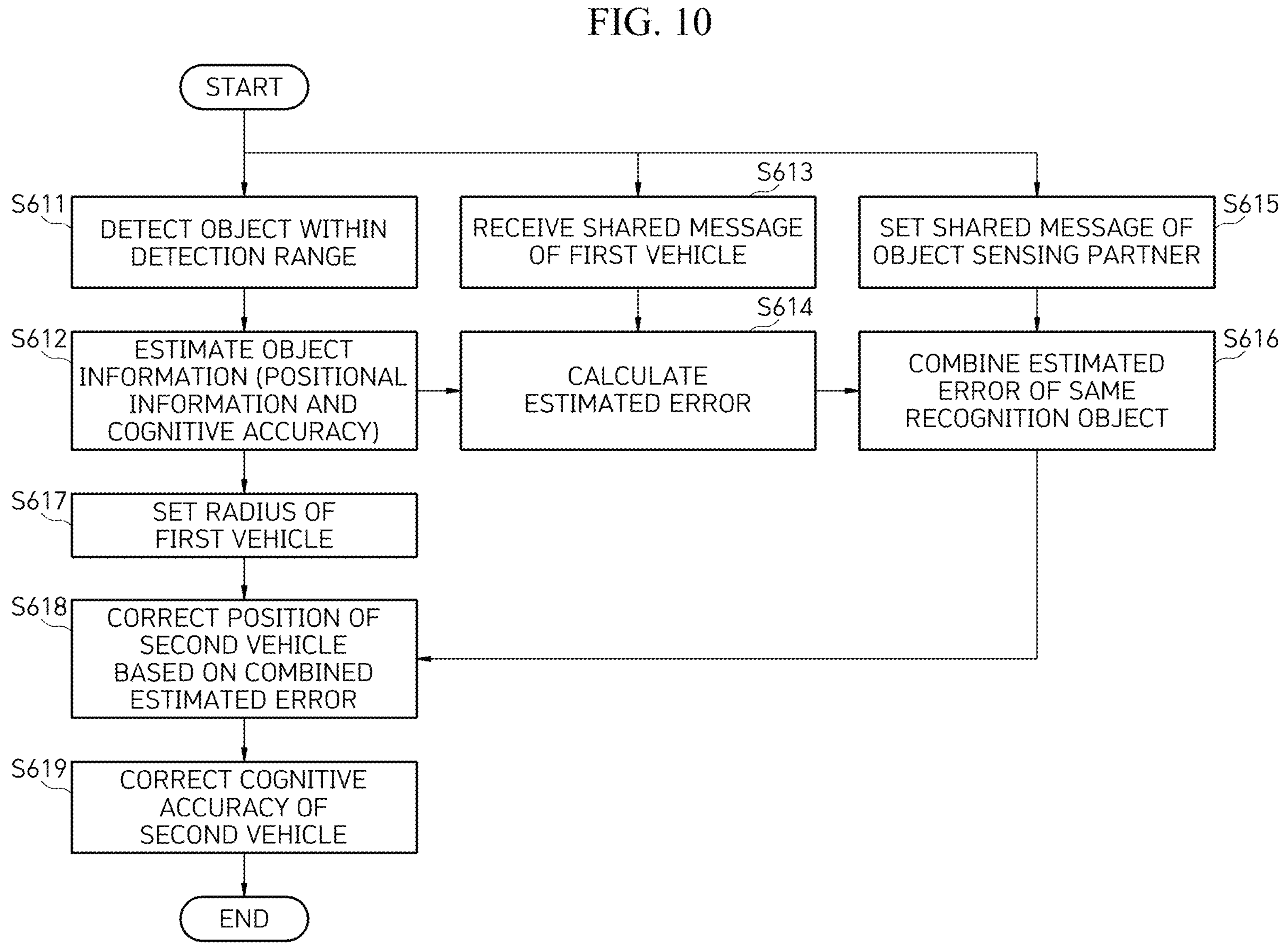
FIG. 10 is a flowchart of a precise position correction method according to fourth to sixth scenarios in an embodiment of the present invention.
Figure 11:
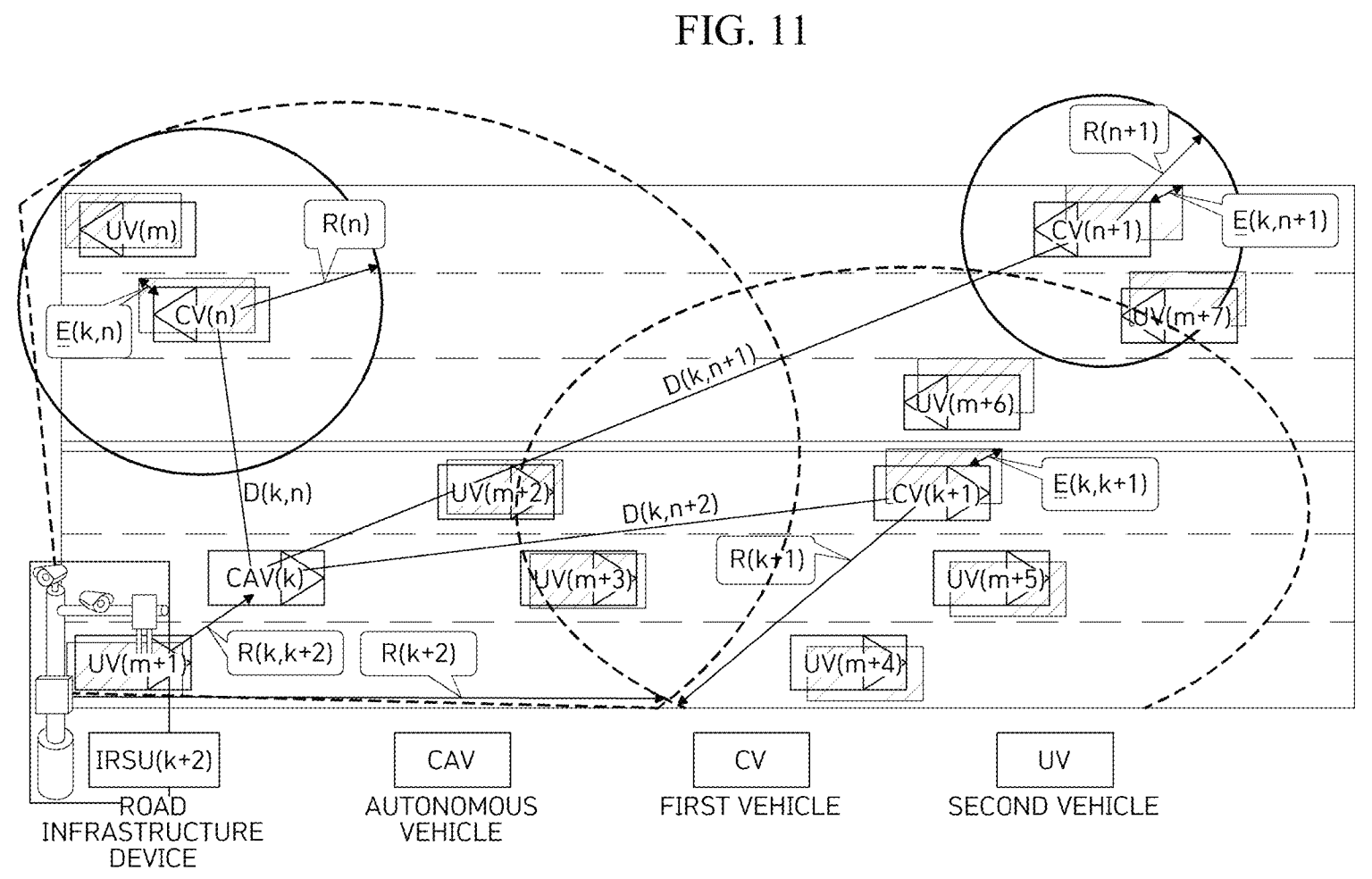

FIG. 10 is a flowchart of a precise position correction method according to fourth to sixth scenarios in an embodiment of the present invention. FIG. 11 is a diagram illustrating an example of the fourth to sixth scenarios in a driving road environment according to an embodiment of the present invention. In this case, in the descriptions of the fourth to sixth scenarios, descriptions that overlap with the descriptions of the first to third scenarios described above are omitted as much as possible, but are not necessarily excluded.

The fourth scenario represents the situation where a plurality of autonomous vehicles (including other autonomous vehicles), the first and second vehicles, and one road infrastructure device exist, and the fifth scenario represents the situation where one autonomous vehicle and a plurality of first and second vehicles, and a plurality of road infrastructure devices exist, and the sixth scenario represents the situation where a plurality of autonomous vehicles (including other autonomous vehicles), the first and second vehicles, and the road infrastructure device exist.

In one embodiment, the autonomous vehicle estimates the object information on the road existing within the detection range through the mounted sensor (S611 and S612). In the situation where In situations where each or a combination of at least one of other autonomous vehicles and road infrastructure devices exists in plurality, simultaneously with or differently from steps S611 and S612, the autonomous vehicle may receive the shared message (object information) broadcast from the object sensing partner and the shared message from the first vehicle which is the CV (S613 and S615).

Next, the autonomous vehicle calculates the estimated error as in step S214 (S614). Similarly, the object sensing partner may also calculate the estimated error through the difference between the positional information included in the object information estimated for the first vehicle and the positional information of the first vehicle received by the object sensing partner, so the estimated error calculated by the autonomous vehicle and the estimated error calculated by the object sensing partner are combined (S616). For example, when the object sensing partner has better positional recognition accuracy than the same object recognized by the autonomous vehicle, and when the object sensing partner shares the positional information of the second vehicle which is the UV, the positional information may be utilized as it is. In addition, when the information on the second vehicle that the autonomous vehicle does not recognize is shared, the information may be used as it is.

Next, the autonomous vehicle may set the reference radius of the first vehicle based on the distance information between the autonomous vehicle and the first vehicle, the cognitive accuracy for the first vehicle, and the calculated estimated error (S617). As described above, when the first vehicle is the CV, it is referred to as the reference radius. The distance between the autonomous vehicle and the first vehicle corresponding to the estimated error exceeds the reference radius set for the first vehicle by a predetermined ratio, and the autonomous vehicle may correct the positional information of the second vehicle positioned within the reference radius.

Next, the autonomous vehicle may correct the object information (positional information and cognitive accuracy) for the second vehicle by reflecting the estimated error that combines the estimated error calculated by the autonomous vehicle and the estimated error of the object sensing partner (S618 and S619).

Meanwhile, in the above description, steps S110 to S619 may be further divided into additional steps or combined into fewer operations according to an implementation example of the present invention. Also, some operations may be omitted if necessary, and an order between operations may be changed. In addition, even if other contents are omitted, the contents described in FIGS. 1 to 11 and the contents described in FIG. 12 may be mutually applied.

Figure 12:
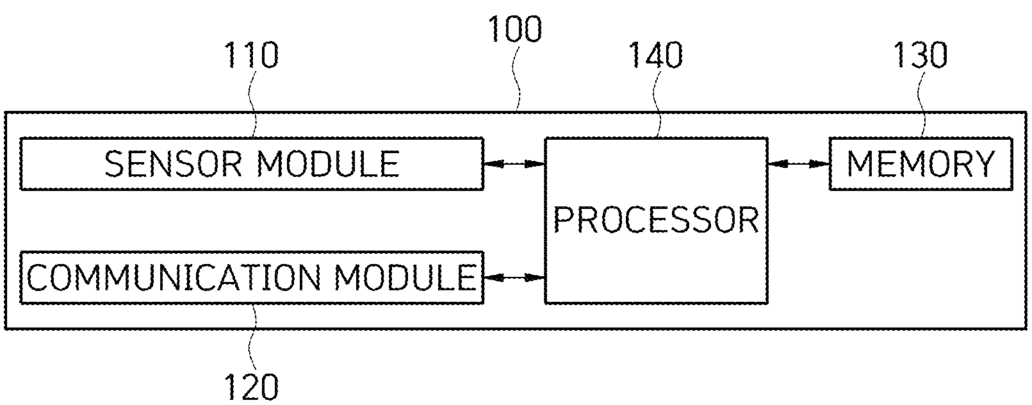
FIG. 12 is a block diagram of an autonomous vehicle capable of precise position correction based on collaborative cognition according to an embodiment of the present invention.

FIG. 12 is a block diagram of an autonomous vehicle 100 capable of precise position correction based on collaborative cognition according to an embodiment of the present invention.

The autonomous vehicle 100 according to an embodiment of the present invention includes a sensor module 110, a communication module 120, a memory 130, and a processor 140.

The sensor module 110 includes a predetermined sensor for object detection. In this case, the sensors may include the above-described camera, lidar, radar, and ultrasonic sensors.

The communication module 120 may transmit and receive data to and from at least one another autonomous vehicle 100, the first vehicle, and the road infrastructure device. In addition, the communication module 120 transmits and receives data between internal components of the autonomous vehicle 100 or performs communication with external devices such as an external server. The communication module 120 may include both a wired communication module and a wireless communication module. The wired communication module may be implemented as a power line communication device, a telephone line communication device, cable home (MoCA), Ethernet, IEEE1294, an integrated wired home network, and an RS-485 control device. In addition, the wireless communication module may be configured in a module for implementing functions such as wireless LAN (WLAN), Bluetooth, HDR WPAN, UWB, ZigBee, Impulse Radio, 60 GHz WPAN, Binary-CDMA, wireless USB technology and wireless HDMI technology, 5th (5G) generation communication, long term evolution-advanced (LTE-A), long term evolution (LTE), and wireless fidelity (Wi-Fi).

The memory 130 stores programs for estimating and correcting the object information based on the shared message and the sensing data of the sensor module 110. Here, the memory 130 collectively refers to a non-volatile storage device that continuously maintains stored information even when power is not supplied and a volatile storage device. For example, the memory 130 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM.

The processor 140 may execute software such as a program to control at least one other component (e.g., hardware or software component) of the autonomous vehicle 100, and may perform various data processing or calculations.

The precise position correction method based on collaborative cognition according to the embodiment of the present invention described above may be embodied as a program (or application) and stored in a medium for execution in combination with a computer which is hardware.

In order for the computer to read the program and execute the methods implemented as the program, the program may include a code coded in a computer language such as C, C++, JAVA, Python, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which position (address street number) in an internal or external memory of the computer the additional information or media necessary for the processor of the computer to execute the functions is to be referenced at. In addition, when the processor of the computer needs to communicate with any other computers, servers, or the like positioned remotely in order to execute the above functions, the code may further include a communication-related code for how to communicate with any other computers, servers, or the like using the communication module of the computer, what information or media to transmit/receive during communication, and the like.

The storage medium is not a medium that stores videos therein for a while, such as a register, a cache, a memory, or the like, but means a medium that semi-permanently stores the videos therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

automated vehicle (CAV) or the smart vehicle equipped with various object cognition sensors and communication devices can provide the precise position through the position correction for the connected vehicle positioned within the sensor detection range and general vehicles around the connected vehicle.

That is, according to an embodiment of the present invention, by comparing the recognized position value with the position value of the connected vehicle to calculate the estimated error and using the calculated estimated error to correct the positions of general vehicles, it is possible to more accurately identify the positions of surrounding vehicles. In addition, by setting the radius of the connected vehicle sufficiently small and keeping the radius smaller than the distance from the host vehicle, it is possible to improve the accuracy of correction.

Furthermore, according to an embodiment of the present invention, when the plurality of estimated error values can be acquired, it is possible to estimate the positions of vehicles that exist outside the cognition range by applying the interpolation method. In addition, when general vehicles within the position correction radius of the connected vehicle overlap with the detection range of the autonomous vehicle, it is possible to correct the position by coupling the estimated error value and the object recognition value. In addition, when the position estimation correction radius value is independent for each connected vehicle and the same general vehicle is recognized by an autonomous vehicle and another autonomous vehicle, by updating to object information recognized by another autonomous vehicle having higher cognitive accuracy than that recognized by the autonomous vehicle, it is possible to acquire and maintain more accurate detection results.

In addition, by combining the estimated errors or object information for the same object included in the shared message, it is possible to more accurately estimate the positions of general vehicles.

In addition, since the finally estimated error is used for position correction of general vehicles only when it is satisfied by comparing with the set threshold value, it is possible for the system to perform only the reliable correction.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. A precise position correction method based on collaborative cognition in an autonomous vehicle, comprising:

estimating object information on a road existing within a detection range through a sensor mounted on the autonomous vehicle;

receiving a shared message from at least one of a first vehicle (another connected vehicle (CV) or another connected automated vehicle (CAV)) and a road infrastructure device capable of V2X communication existing on the road, receiving the shared message including driving status information of the other CV when the first vehicle is the other CV, and receiving the driving status information of the other CAV and the shared message about a second vehicle (the second vehicle is a vehicle in which the V2X communication is not possible) recognized by the other CAV;

calculating an estimated error by comparing the estimated object information with the shared message; and setting a radius (when the first vehicle is another CV, it means a reference radius, and when the first vehicle is another CAV, it means a recognition radius) based on the first vehicle corresponding to an estimated error application radius in consideration of a distance between the autonomous vehicle and the first vehicle, wherein the setting the radius includes comprehensively determining the radius based on distance information between the autonomous vehicle and the first vehicle, cognitive accuracy for the first vehicle, and the estimated error, wherein the radius defines a target area for selecting the second vehicle to which position correction is to be applied, wherein the target area is configured as one of a circular area, a peanut-shaped area, or an area partially extended outward from the circular area, wherein the calculating the estimated error further includes calculating the estimated error through an interpolation method using a plurality of estimated error values configured in a two-dimensional or three-dimensional surface form, wherein the estimated error is used for position correction only when the estimated error satisfies a predetermined threshold value.

2. The method of claim 1, wherein the estimating of all the object information on the road existing within the detection range through the sensor mounted on the autonomous vehicle includes estimating classification information, positional information, and cognitive accuracy for distinguishing the first vehicle and the second vehicle as the object information.

3. The method of claim 2, wherein the calculating of the estimated error by comparing of the estimated object information with the shared message includes calculating the estimated error through a difference between positional information included in the estimated object information of the first vehicle and the received positional information of the first vehicle.

4. The method of claim 3, further comprising correcting the object information based on the estimated error, wherein the correcting of the object information based on the estimated error includes, when the first vehicle is the other CV, correcting the estimated position of the second vehicle positioned within the radius (reference radius) by reflecting the estimated error according to the setting of the radius (reference radius) based on the first vehicle based on distance information between the autonomous vehicle and the first vehicle, cognitive accuracy for the first vehicle, and the estimated error, and updating the cognitive accuracy included in the object information to the cognitive accuracy corresponding to the corrected estimated position.

5. The method of claim 4, wherein the correcting of the object information based on the estimated error includes correcting estimated positions of surrounding objects (vehicles recognized by the autonomous vehicle and for which V2X communication is not possible) positioned outside the reference radius in consideration of the estimated error and updating the cognitive accuracy.

6. The method of claim 3, further comprising correcting the object information based on the estimated error, wherein the correcting of the object information based on the estimated error includes, when the first vehicle is the other CAV, correcting the position of the second vehicle estimated by the autonomous vehicle using the position of the second vehicle transmitted by the other CAV and updating the cognitive accuracy.

7. The method of claim 3, further comprising correcting the object information based on the estimated error, wherein the correcting of the object information based on the estimated error includes, when the first vehicle is both the other CV and another CAV, correcting the position of the second vehicle that exists in an overlapping area of the reference radius of the other CV and the recognition radius of the other CV, correcting the position of the second vehicle through an interpolation method using both the estimated error calculated using the information received from the other CV and the information recognized by the other CAV, and updating the cognitive accuracy.

8. The method of claim 3, further comprising correcting the object information based on the estimated error, wherein the correcting of the object information based on the estimated error includes, when the shared message is received from the first vehicle that is the other CV and the road infrastructure device, correcting the position of the second vehicle positioned within the reference radius of the first vehicle using both the estimated error related to the first vehicle calculated by the autonomous vehicle and the estimated error related to the first vehicle calculated by the road infrastructure device.

9. The method of claim 3, further comprising correcting the object information based on the estimated error, wherein the correcting of the object information based on the estimated error includes, when the shared message is received from the first vehicle, which are both the other CV and another CAV, and the road infrastructure device, calculating the finally estimated error related to the other CV by jointly calculating the estimated error related to the other CV calculated by the other CAV, the estimated error related to the other CV calculated by the road infrastructure device, and the estimated error related to the other CV calculated by the autonomous vehicle, deriving the reference radius of the other CV, and correcting the position of the second object within the reference radius.

10. An autonomous vehicle capable of precise position correction based on collaborative cognition, comprising:

a sensor module composed of a predetermined sensor for detecting an object;

a communication module receiving a shared message from at least one of a first vehicle (another connected vehicle (CV) or another connected automated vehicle (CAV)) and a road infrastructure device capable of V2X communication existing on the road, receiving the shared message including driving status information of the other CV when the first vehicle is the other CV, and receiving the driving status information of the other CAV and the shared message about a second vehicle (the second vehicle is a vehicle in which the V2X communication is not possible) recognized by the other CAV;

a memory storing a program for estimating and correcting object information based on the shared message and sensing data of the sensor module; and a processor executing a program stored in the memory to estimate object information from the sensing data, calculating an estimated error by comparing the estimated object information and the shared message, and setting a radius (when the first vehicle is another CV, it means the reference radius, and when the first vehicle is another CAV, it means a recognition radius) based on the first vehicle corresponding to an estimated error application radius, wherein the processor is configured to comprehensively determine the radius based on distance information between the autonomous vehicle and the first vehicle, cognitive accuracy for the first vehicle, and the estimated error, wherein the radius defines a target area for selecting the second vehicle to which position correction is to be applied, wherein the target area is configured as one of a circular area, a peanut-shaped area, or an area partially extended outward from the circular area, wherein the processor is configured to calculate the estimated error through an interpolation method using a plurality of estimated error values configured in a two-dimensional or three-dimensional surface form, wherein the processor is configured to use the estimated error for position correction only when the estimated error satisfies a predetermined threshold value.

* * * * *